United States Patent
ter Horst (10) Patent No.: US 11,719,454 B1
(45) Date of Patent: Aug. 8, 2023

(54) SYSTEM AND METHOD FOR OPTIMIZING SELECTION OF AN AIR FILTER

(71) Applicant: Filtration Advice, Inc., Boca Raton, FL (US)

(72) Inventor: Dirk ter Horst, Boca Raton, FL (US)

(73) Assignee: Filtration Advice, Inc., Boca Raton, FL (US)

( * ) Notice: Subject to any disclaimer, the term of this patent is extended or adjusted under 35 U.S.C. 154(b) by 0 days.

(21) Appl. No.: 17/900,517

(22) Filed: Aug. 31, 2022

(51) Int. Cl.
 *F24F 11/47* (2018.01)
 *F24F 11/39* (2018.01)
 (Continued)

(52) U.S. Cl.
 CPC .......... *F24F 11/47* (2018.01); *B01D 46/0086* (2013.01); *B01D 46/10* (2013.01); *F24F 11/39* (2018.01)

(58) Field of Classification Search
 CPC ....... F24F 11/39; F24F 11/47; B01D 46/0086; B01D 46/10
 See application file for complete search history.

(56) References Cited

U.S. PATENT DOCUMENTS

2006/0004492 A1* 1/2006 Terlson .................... F24F 11/30
 700/276
2006/0130497 A1* 6/2006 Kang ........................ F24F 11/30
 62/127

(Continued)

FOREIGN PATENT DOCUMENTS

EP 2105677 A1 * 9/2009 ............ B01D 46/44
WO WO-2011163638 A1 * 12/2011 ............ B01D 46/42
 (Continued)

*Primary Examiner* — Ronald D Hartman, Jr.
(74) *Attorney, Agent, or Firm* — Bachman & LaPointe, P.C.

(57) ABSTRACT

A method for determining a filter selection for an air filtration system having a current air filter includes entering filtration system information into a processor having access to pressure drop versus dust holding capacity curves for a plurality of different air filters, wherein the filtration system information includes user experience information including volume of air processed with the current air filter in the air filtration system and pressure drop with the current air filter after processing the volume of air; determining a cost factor of operating the air filtration system with the current filter for processing the volume of air; determining a theoretical quantity of dust held by the current filter at the pressure drop using a pressure drop versus dust holding capacity curve for the current air filter and the pressure drop exhibited by the current air filter after processing the volume of air; selecting a proposed air filter from the plurality of different air filters and different from the current air filter; determining an estimated volume of air that can be processed with the proposed air filter to reach the pressure drop, this determining step being conducted using the theoretical quantity of dust and a pressure drop versus dust holding capacity curve for the proposed air filter; determining an estimated cost factor of operating the air filtration system with the proposed filter for processing the volume of air; and presenting a comparison of the cost factor and the estimated cost factor on a display communicated with the processor.

20 Claims, 5 Drawing Sheets

(51) Int. Cl.
   *B01D 46/10*   (2006.01)
   *B01D 46/00*   (2022.01)

(56)           References Cited

U.S. PATENT DOCUMENTS

2015/0330650 A1 * 11/2015  Abiprojo .................. F24F 11/39
                                                        700/276
2021/0008482 A1 *  1/2021  Staykova ................  H04W 4/33

FOREIGN PATENT DOCUMENTS

WO      WO-2016089688 A1 *   6/2016   ......... B01D 46/0086
WO      WO-2019204786 A1 *  10/2019   ........... B01D 46/008

* cited by examiner

SYSTEM AND METHOD FOR OPTIMIZING SELECTION OF AN AIR FILTER

BACKGROUND OF THE INVENTION

The invention relates to a system and method for improving the selection and operation of filters of an HVAC system and other air/gas filtration systems.

Air handling systems such as any of a wide variety of HVAC systems typically utilize various air handling and conditioning equipment and ducts and the like for transporting air from one location to another and conditioning that air as it is being transported prior to introduction of the conditioned air into the space to be conditioned.

It is frequently desirable to filter the air in the course of this handling, for the purposes of removing various particulate and/or gaseous matter and the like which may be entrained in the air, and thereby provide a better-quality conditioned air to the conditioned space. As can be appreciated, filters in such systems gradually accumulate such entrained particulate and other matter from the air, and as this matter accumulates on the filter, the resistance to flow of air through the filter increases. This leads to an increase in pressure drop at the filter, and thus a decrease in operating efficiency.

Due to these factors, there is a need to change filters in air conditioning systems on a periodic basis. This changing of filters can be as simple as opening of one or more filter housings in an easy to access location and installing a new filter, to replacing potentially large filters in difficult to reach locations in industrial facilities. Regardless of the environment, the best time for changing such filters, and for that matter the best type of filters to use, is often a matter of guesswork.

Based on the above, much efficiency is lost through utilization of a filter that is not best suited due to the cost of the energy and other filtration associated costs that are associated to the particular filter during its useful life, and also through changing such filters either too early or too late. U.S. Pat. Nos. 9,546,942, and 10,527,537 disclose an effective approach to reduce losses due to inefficiency of the filter and guesswork decisions upon when a filter should be changed. These disclosures focus on pressure drop and time of operation in the user experience for existing filters. Since user experience is varied from location to location, additional approaches to employing user experience in order to evaluate and determine more efficient filter choices is desirable.

SUMMARY OF THE INVENTION

In accordance with the invention, a system and method are provided for enhancing the economic efficiency and operation of HVAC and other filtration systems by identifying the total cost of ownership of the filters for such systems. According to the invention, this is accomplished using a pressure drop at which a filter is changed, and a volume of air processed with the filter up to that pressure drop. With this information, use of the filter can be optimized, for example to the most efficient changeout schedule, specifically a volume of air to be processed with the filter at which time the filter should be changed. Further, with this information, other filters can be evaluated for use in the same conditions to determine whether a different filter could provide better results, for example in efficiency or total cost. Use of a proposed different filter can also be optimized.

Basing these determinations on the filter user's real location and experience data including air flow in the system, specifically the flow volume handled by the system, and the pressure drop experienced for that air flow, allow evaluations based upon estimated air filtration conditions experienced by the filter during use.

In accordance with the present invention, the starting user experience information should include at least the volume of air processed and the pressure drop at the time of changeout of the filter, as well as what type of filter was being used.

As discussed herein, the volume of air that flows through a system can be determined with various instruments. For example, if a system has or can be provided with a probe to measure flow velocity past a point in a duct, with a known flow area of the duct, flow volume can be determined. In another example, air volume can be estimated from energy used by the motor of a fan in ductwork to the filter that moves the air through the filter. This approach is both complicated but also useful for systems that are not operated full time and do not have other instruments to measure flow volume. Numerous other methods can also be utilized in order for a user to know or estimate the volume of air processed with a filter.

Determining filter efficiency and the like based upon pressure drop per total volume of flow as disclosed herein is an improvement over calculations based on time since these calculations can fail to account for periods where the HVAC system is not in operation, for example, when the system is in use in a building that closes overnight or over weekends, or when occupants of a building are away for extended periods of time, or the like. By making measurements and determinations based upon the volume of air handled by a system, more accurate determination of the environmental conditions, especially the amount of dust or other material carried by the air being filtered.

The system and method disclosed herein make determinations based upon user experience, factoring in what specific filter the user is using or has used and what the experience is or was with that filter. Useful experience information includes system air flow rate as mentioned above, as well as historical information such as how often and at what pressure drop the filter or filters are normally changed by the user, and the total volume of air processed by the filter when it reaches that pressure drop.

Another source of information that is useful in making the determinations or estimates as disclosed herein are data developed for various filters in test conditions resulting in relationships for each filter of pressure drop versus accumulated test dust or dust holding capacity. There are known sources of such data, for example ASHRAE 52.2 and other pressure drop versus dust holding capacity curves. Other standards could also be used, such as EN 779 or ISO 16890 or the like. These standards allow comparison of different filters under conditions corresponding to the entered user experience.

Knowing filter manufacturer and model/type that is being used, the pressure drop at which the filter is to be changed, and the volume of air handled until that pressure drop is reached, the ASHRAE 52.2 or other curves showing a relationship for that filter of pressure drop (DP) vs. dust holding capacity (DHC) of that particular filter allows the system to indirectly determine or estimate air quality at the location and use this information to estimate performance with currently used and/or proposed filters. Further, the system can take numerous other factors into account to make the filter evaluation as accurate to the specific user needs and location as possible.

According to the invention, a method for determining a filter selection for an air filtration system having a current air filter, comprising the steps of: entering filtration system information into a processor having access to pressure drop versus dust holding capacity curves for a plurality of different air filters, wherein the filtration system information includes user experience information including volume of air processed with the current air filter in the air filtration system and pressure drop with the current air filter after processing the volume of air; determining a cost factor of operating the air filtration system with the current filter for processing the volume of air; determining a theoretical quantity of dust held by the current filter at the pressure drop using a pressure drop versus dust holding capacity curve for the current air filter and the pressure drop exhibited by the current air filter after processing the volume of air; selecting a proposed air filter from the plurality of different air filters and different from the current air filter; determining an estimated volume of air that can be processed with the proposed air filter to reach the pressure drop, this determining step being conducted using the theoretical quantity of dust and a pressure drop versus dust holding capacity curve for the proposed air filter; determining an estimated cost factor of operating the air filtration system with the proposed filter for processing the volume of air; and presenting a comparison of the cost factor and the estimated cost factor on a display communicated with the processor.

In another non-limiting embodiment, the steps of determining the cost factor and the estimated cost factor comprise determining cost for processing the volume of air based upon at least one cost criteria selected from the group consisting of filter cost, energy cost, labor cost, used filter disposal cost, carbon footprint cost, number of filter changes needed for processing the volume of air, and combinations thereof.

In still another non-limiting embodiment, the entering step further comprises entering relevant cost criteria of the user into the processor, and wherein the steps of determining the cost factor and the estimated cost factor are based on the relevant cost criteria.

In a further non-limiting embodiment, the processor is configured to determine estimated energy cost from a pressure drop profile of the pressure drop versus dust holding capacity curve for the proposed filter for processing the volume of air.

In a still further non-limiting embodiment, the presenting step comprises presenting the comparison as cost per unit volume of air to be processed with the air filtration system.

In another non-limiting embodiment, the method further comprises determining an optimized changeout schedule for the proposed filter based upon the estimated cost factor, and wherein the presenting step further comprises presenting the optimized changeout schedule on the display.

In still another non-limiting embodiment, the volume of air processed is obtained from instruments in the air filtration system and provided to the processor.

In a further non-limiting embodiment, the volume of air processed is determined based on energy consumption of a motor of the air filtration system.

In a still further non-limiting embodiment, the processor has access to energy cost information, and wherein the presenting step includes presenting estimated cost based upon the energy cost information.

In another non-limiting embodiment, the method further comprises optimizing a changeout schedule for the current filter based on the cost factor and presenting an optimized change out schedule for the current filter on the display.

In still another non-limiting embodiment, the user experience information includes a starting pressure drop at a start of operation for the air filtration system using the current air filter.

In a further non-limiting embodiment, the step of selecting a proposed filter comprises limiting possible selection of a proposed filter to filters that will fit the air filtration system.

In another embodiment, a method for optimizing a changeout schedule for an air filtration system using an air filter based upon user experience with a current air filter, comprises the steps of entering user experience information into a processor having access to pressure drop versus dust holding capacity curves for a plurality of different air filters, wherein the user experience information comprises a volume of air processed by the current air filter in the air filtration system and pressure drop of the current filter after processing the volume of air; using the pressure drop versus dust holding capacity curve for the current filter to determine a theoretical quantity of dust held by the current filter after processing the volume of air; determining a cost factor for using the current air filter per volume of air processed up to the pressure drop; determining an estimated cost factor for using the current air filter per volume of air processed up to one or more proposed different pressure drops for changeout; and presenting the cost factor and the estimated cost factor for the current filter on a display.

In still another non-limiting embodiment, the method further comprises determining a plurality of estimated cost factors for a range of different proposed pressure drops for changeout, and optimizing a proposed changeout schedule based upon the plurality of estimated cost factors.

In a further non-limiting embodiment, the steps of determining the cost factor and the estimated cost factor comprise determining cost for processing the volume of air based upon at least one cost criteria selected from the group consisting of filter cost, energy cost, labor cost, used filter disposal cost, carbon footprint cost, number of filter changes needed for processing the volume of air, and combinations thereof.

In a still further non-limiting embodiment, the entering step further comprises entering relevant cost criteria of the user into the processor, and wherein the steps of determining the cost factor and the estimated cost factor are based on the relevant cost criteria.

In another non-limiting embodiment, the processor is configured to determine estimated energy cost from a pressure drop profile of the pressure drop versus dust holding capacity curve for the current filter for processing the volume of air.

In another embodiment, a system for determining a filter selection in an air filtration system having a current air filter comprises an interface for entering filtration system information into a processor having access to pressure drop versus dust holding capacity curves for a plurality of different air filters, wherein the filtration system information includes user experience information including volume of air processed with a current air filter in the air filtration system and pressure drop after processing the volume of air; the processor being configured to receive the filtration system information and to use the pressure drop versus dust holding capacity curves for the plurality of air filters and the user experience information to determine a cost factor for using the current air filter to process the volume of air, and also being configured to determine an estimated cost factor use of a proposed air filter of the plurality of air filters and different from the current filter to process the volume of air;

and a display communicated with the processor for presenting a comparison of the cost factor and the estimated cost factor.

In still another non-limiting embodiment, the processor is configured to determine an optimized changeout schedule for the proposed air filter; and to present the optimized changeout schedule on the display.

In a further non-limiting embodiment, the processor is further configured to determine an optimized changeout time for the current air filter, and to present the optimized changeout schedule for the current filter on the display.

It should be appreciated that while various embodiments and features are disclosed herein, these embodiments and features thereof can be combined in other configurations well within the scope of the present disclosure.

BRIEF DESCRIPTION OF THE DRAWINGS

A detailed description of preferred embodiments of the present invention follows, with reference to the attached drawings, wherein.

DETAILED DESCRIPTION

The invention relates to a system and method for determining an appropriate filter to use in an air filtration system, and to optimize the use or changeout schedule of that filter. The system and method are based upon user experience information generated in use of the air filtration system, and focus on the volume of air processed by the air filtration system so that the output can be based upon actual volume processed by the filter and thereby more accurately represent the use of the filter, conditions to which the filter is exposed, and possible improvements in selection and use of the filter.

Existing systems and methods are disclosed in U.S. Pat. Nos. 9,546,942, and 10,527,537, which are incorporated herein in their entirety by reference. As set forth in these patents, user experience can be collected and used to calculate the total cost of use of the existing filters in the system, to compare cost of use for one or more different proposed filters, and optionally to recommend a suitable changeout schedule for the current and/or proposed filters. Methods and systems such as those disclosed in the aforesaid U.S. Pat. Nos. 9,546,942, and 10,527,537 provide effective methods for estimating energy use and cost over time. Nevertheless, when an air filtration system is not run constantly or consistently, for example at different fan speeds, and/or is intermittently turned off, it can be difficult to determine the actual meaning of the user experience information called for in these patents.

According to the present disclosure, user experience information to be collected is focused on a volume of air processed or handled by the system during the lifespan of a filter, typically to a pressure drop at which the filter is to be changed. With this volume of air handled by the air filtering system with a current filter, and pressure drop after the handling of this volume of air, information related to the environmental conditions or air quality that is handled by the air filtering system can be determined and used to evaluate the current filter and proposed filters for efficiency, cost of use, and appropriate changeout schedule.

Conditions in air to be processed through a filter in a location can vary widely in different locations due to numerous different factors. The accumulated material in a filter after processing a volume of air leads to an increase in pressure drop, which leads to the ultimate end of use of a particular filter, when the pressure drop reaches the point where for any of numerous possible reasons, further use of that filter is not practical. The pressure drop can be caused by simple particulates caught in the filter media, and also by many other conditions including humidity, possible chemical reactions of the particulates and/or other gases in the air, and the like. The real-life factors contributing to the pressure drop are different in virtually every environment.

To help understand air filter performance, air filters are evaluated using standardized tests to generate behavior curves in terms of change in pressure drop across the filter versus accumulation of material held by the filter. These tests are simulated using test dust and otherwise under the same conditions. Thus, the test curves resulting from these tests are standardized to the same conditions, based upon accumulation of test dust. Examples of testing standards and resulting behavior curves, known as pressure drop versus dust holding capacity curves, include ASHRAE test standard 52.1 or 52.2, EN 779 or ISO 16890, or the like. The test curves generated by this standard represent the theoretical behavior of a particular filter in a standardized set up of test conditions. Thus, with these curves, the amount of test dust per area in a filter at a specified pressure drop can be determined, and this amount can then be carried over to other curves for other filters to estimate the pressure drop that would be shown by other filters with that same level of test dust. While real life performance of a filter will be influenced by other factors such as, for example, humidity and other non-particulate factors that lead to pressure drop, these curves are nevertheless useful in estimating the behavior of a proposed filter in similar circumstances to that which are experienced with a known filter.

The present invention utilizes these curves and user experience information including air volume processed with a current air filter and corresponding pressure drop after processing that volume of air to optimize the use of the current filter, identify and proposed more suitable filters, and/or optimize the use of the more suitable filters as well.

Figure 1:
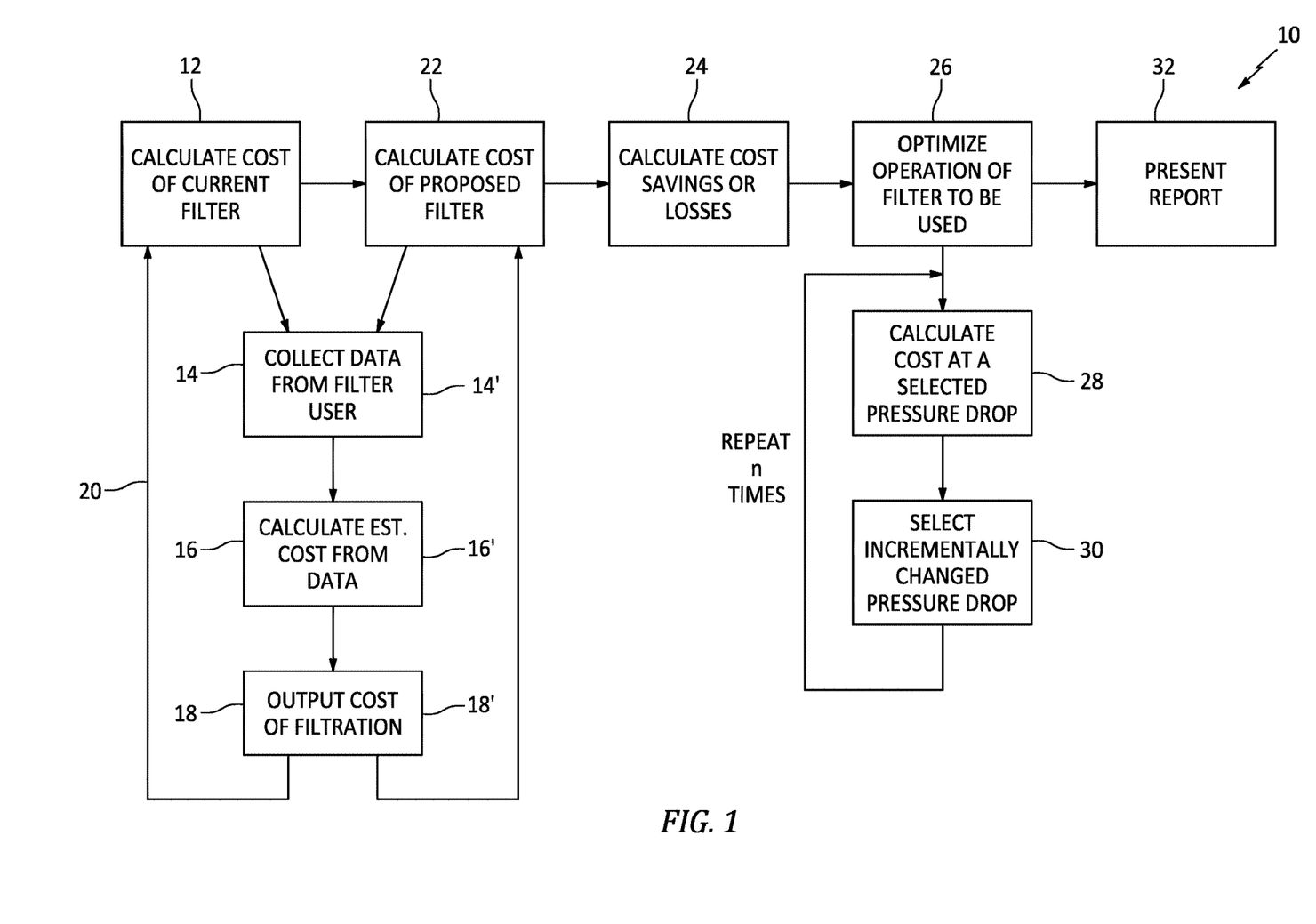
FIG. 1 is a flow chart showing operation of a system in accordance with the present invention.

FIG. 1 shows a schematic flowchart of various steps which can be taken by a method or process 10 in accordance with the invention to compare cost factors for current and proposed filters, and also to optimize the use of either or both filters. Selection steps are shown in the left side of the drawing, and optimization steps are shown in the right side of the drawing. The process represented shows first the identification of a proposed filter, and then optimization of use of the proposed filter, all of which are then presented on a display in a report. It should be appreciated, however, that these steps can be conducted separately and/or in different order.

Still referring to FIG. 1, the first step 12 involves calculating the cost or cost factor of use the current filter. This can be accomplished by collecting data from the filter user, step 14. This data, or user experience information, is discussed herein and can include operation details of the system, the number and type of filters used by the system, starting and ending pressure drop at the filter, and numerous other data points that can be collected as user experience information. Also, as disclosed herein, this information also includes a volume of air processed by the filter to reach the ending pressure drop.

User experience information can also include specific cost criteria that are important to the user so that the cost calculation includes those criteria.

With the user input, a determination or calculation is made as to cost of use of the current filter, step 16. This cost can be considered in terms of cost for handling the volume of air processed that led up to the ending pressure drop or pressure drop at changeout of the filter, and generates an output 18 of the cost.

The user can now select another air filter, or a proposed air filter (step 22), and an estimated cost or cost factor can then be determined for the proposed air filter using the user experience information. These steps are shown at 14', 16' and 18' in FIG. 1. The determined cost 18 and estimated cost 18' can then be compared and presented in a display as a calculation of cost savings or losses, step 24. These steps will be further discussed in detail below.

Still referring to FIG. 1, an optimization can also be conducted in order to optimize use of either or both of the current and proposed filters in the air filtration system. As with the selection steps, the optimization is also based upon the volume of air processed, or possible to be processed, up to changeout for the respective filter.

In step 26, optimization of a filter can be done by calculating cost or cost factor of processing a volume of air up to a selected pressure drop (step 28). This same determination can then be done for an incrementally changed pressure drop (step 30) to determine the cost or cost factor for processing the same volume of air with changeout of the filter at the incrementally changed pressure drop. This process can be repeated n times until sufficient information is obtained to allow selection of the most favorable, or optimized, changeout schedule for the selected filter under the specific user experience input. This data can then be presented in a report on a display as shown in step 32.

As set forth above, the changeout of a filter and determination of cost of using the filter in the system and method disclosed herein are based upon the volume of air processed by the filter up to the pressure drop at which the filter is changed. Thus, entering the volume of air actually processed by the filter is an important piece of starting information.

Air volume handled by an air filtering system can be determined in several ways. First, volumetric flow rate can be directly measured if proper instrumentation is available. Estimations can be made or inferred from other instruments as well. Alternatively, when flow velocity is known, volumetric flow rate can be determined using the flow area at the point of measurement of the flow velocity and actual volume determined from the time operating at this velocity. In another non-limiting configuration, if only the energy to a motor for the filtering system, as well as drive and fan efficiency, are known, this information can also be used to determine, or at least reasonable estimate, the total volume of air handled by the system.

Still referring to FIG. 1, user experience information is used to calculate a cost or cost factor of using the current filter and to estimate the cost or cost factor of using a proposed air filter (steps 16, 16') to process the volume of air. The cost or cost factor can be tailored to a user through entry by the user of relevant cost criteria. For example, user cost criteria can include one or more criteria selected from the group consisting of filter cost, energy cost, labor cost, used filter disposal cost, carbon footprint cost, number of filter changes needed for processing the volume of air, and combinations thereof. Of course, other relevant criteria can also be entered. It should be appreciated that although this is referred to herein as a cost or cost factor, specific costs themselves might not be the only factor. As one non-limiting example, if labor to change the filters is difficult to secure, then the selection and/or optimization of a filter might be driven primarily by the maximum quantity of air a filter can process before reaching a maximum acceptable pressure drop.

When cost of energy is critical, this cost can be estimated by determining the theoretical energy consumption of the currently used air filter, that is, the filter that is being or has been used. This is based upon a determination of the energy consumption of the air filter when first installed, as well as the energy consumption of the air filter just prior to it being changed out and the gradually increasing energy consumption of the air filter between these points due to the gradually increasing pressure drop across the filter that is brought on by dust loading of the filter as it filters the passing air. This increase is represented by the curve in the filter test data referred to above, which will represent the rate of increase of pressure drop for that filter as theoretical particles or test dust accumulate on the filter. The actual energy used is of course influenced by the pressure drop, and therefore the nature of the curve for a particular filter also influences the energy used with that filter from beginning to end of use processing the volume of air.

As set forth above, the projected change in pressure drop for a filter can be estimated, for example, by utilizing ASHRAE test standard 52.1 or 52.2, EN 779 or ISO 16890, or the like. The test curves generated by this standard represent the practical behavior of a particular filter in a standardized set up of test conditions. Due to different environmental factors, this curve is of course an estimate. Thus, it is advisable or recommended in connection with the methods disclosed herein to test the initial estimate based on user experience after a period of use, for example after processing several changeout volumes of air.

The pressure drop of the air filter at the time that particular user changes out the air filter is preferably known through instrumentation, for example pressure gauges at the location. Some probes can measure both pressure drop and flow rate, which is desirable in the present disclosed methods as providing data for both the volume of air processed by the current air filter and the pressure drop across the air filter after processing this volume of air. If this instrumentation is not available, for example if it is not possible to measure the pressure drop of the filters at the time of change out, the system and method can be run or otherwise carried out using different incremental pressure drop estimates at the time of changeout in order to generate the corresponding costs and estimated costs and optimized changeout volumes. For example, it is common practice to change a filter at a pressure drop of ⅓ the rated capacity of the filter. Thus, this may be the pressure drop entered as part of the user experience. Further, some manufacturers recommend changing every 3 months. In these circumstances, the information entered by the user might be the volume of air processed, and the pressure drop, at the 3-month mark. Alternatively, changeout of the filter might be at the maximum rated pressure drop, which can be different depending upon the testing standards for that filter. In some instances, this can be a pressure drop of approximately 1.5" w.g. Filter user experience, if different, can be entered by the filter user and/or operator of the system or if it is not known, it is entered and the method carried out at 1.5", then at 1.4", then at 1.3" and so on in order to get an idea of the effect of different pressure drops at changeout.

In connection with the above determination, the rate of change of the pressure drop from initial use through to change out of a filter can be represented in the test-based non-linear curves of pressure drop (DP) versus dust holding capacity (DHC) of the filter. Thus, these curves are useful not only to determine the theoretical dust loading at a particular pressure drop, but also to determine the slope and/or rate of increase or otherwise the behavior of the pressure drop for a particular filter as the dust held by the filter increase. These curves will at times be referred to herein as DP vs. DHC curves.

The actual rate of increase of pressure drop from beginning of use of a filter through to the pressure drop at which the filer will be changed is important in accurately determining the energy consumption for processing the volume of air in question, as the rate of increase of the pressure drop over this volume of air is naturally related to the energy needed to operate the air filtration system and, therefore, the overall cost of using the filter.

While the energy required to operate an air filter over the lifetime of that air filter will undoubtedly be one cost criteria or factor to be considered in almost any evaluation, the other factors or cost criteria to be included can vary depending upon the needs of a particular user. Several likely factors are discussed herein.

One such factor is the carbon footprint of use of an air filtration system. Environmental concerns are focused on numerous issues, one of which is the carbon footprint created by operation of a particular building, industry, or the like. This carbon footprint can result in cost to the business if too large, or savings to the business if less than a particular standard. Thus, the carbon footprint can lead to direct economic consequences to the user of the HVAC system. The carbon footprint, or $CO_2$ that is generated due to the operation of the filter, can be calculated by multiplying the energy consumed, which has already been determined as above, by a factor established by the Environmental Protection Agency (EPA). Thus, in accordance with the present invention, the system is preferably programmed to carry out this calculation, and to either store or obtain the EPA factor as the case may be. The system could in one embodiment store one or more default values, or even a map associated with the default values to allow a user to find a good default value for a particular location. Alternatively, the system may store a link to such information, for example to an on-line map with associated factors.

The carbon footprint can also be evaluated and presented to the filter user as an estimate of the change in carbon footprint which will occur when switching to a proposed filter as an output. Thus, in addition to economic consequences of a change, the user can also evaluate environmental consequences.

Another clear point of interest is the total estimated cost due to air filtration, and this cost can be estimated by determining the estimated cost of energy consumed during operation of the filter which is determined above. This calculation can be obtained by multiplying the amount of energy that the filter or filters will consume during its change out cycle by the cost of energy. The cost of energy can be stored by the system in accordance with the present invention, or the system can be programmed to obtain this cost based upon geographic location and the like. Once the cost is determined, it can be annualized for accounting purposes, or standardized as to volume of air handled so as to take into account the variable schedule of operation of the air filtration system in question. All costs can advantageously be presented in a per unit volume of air processed basis, so that the comparisons and optimizations do not suffer inaccuracies due to variable or intermittent operation of the system.

An estimation can also be conducted as to the cost of all filtration cycle related direct or indirect costs that the user of the system wants to consider and add to the analysis. These types of costs or cost criteria can include the cost of the filter, the cost of changing out the filter, filter disposal costs, loss of production during change out of the filter, purchasing process costs, availability of personnel to change filters, and the like. These costs also should be annualized or translated to a volume-processed basis so that they can be combined with other costs and used to generate a final cost of the filter that can be compared to the costs of other filters in the process of determining which filter has the best total value.

Another factor or series of factors that can be included are estimated costs of all annual peripherally related costs that the customer or user wants to include, such as filter storage costs, carbon footprint costs or benefits and the like.

Returning to FIG. 1, once the cost has been calculated utilizing the various factors as discussed above, the cost of filtration can be output or presented on a display (step 18). At this point, if desired, portions of the information input can be adjusted, for example to test or flush out the range of possible outcomes when a value has been estimated. This repeat of the process is represented by arrow 20 leading back to step 12.

According to the invention, when the process is implemented on a processor or other computing device, an interface is ideally presented to the user which will lead the user through a series of data entry steps to determine relevant information and which factors to consider in estimating the final data. This interface can be generated by the computing system onto which the process machine instructions are loaded, and various software on that machine can be utilized to generate the appropriate display. The actual machine or device configured to carry out the disclosed steps and determinations could be a portable computing device, a mobile or handheld device such as a smart phone or tablet, a desktop or portable computer, or numerous other devices capable of operating the software to carry out the steps disclosed herein.

The actual operating instructions for making the calculations and determinations discussed above, and generating the display, are those which would be well-known to a person skilled in the art to which this invention is related, and the actual operating system of the computing device does not form any part of the present invention.

FIG. 1 as discussed above schematically shows a series of steps each leading to an output which is then combined to determine a total estimated operating cost of a particular filter (steps 18, 18'). According to the invention, this calculation can be carried out for two or more different filters to generate an estimated operating cost for each of the filters, and these numbers can then be compared to determine which filter is most economical in that particular set of circumstances. The process of the present invention when loaded onto a computing device can advantageously be adapted to present the resulting calculated total operating costs and related information in any meaningful form to help the user compare the differences in total operating costs and the like. One way to compare these estimations would be to carry out the steps of FIG. 1 for the existing filter of a particular user, and then to carry out these calculations for the proposed filter, of course using the DP versus DHC curve of that proposed filter, and carrying out the calculation to the point on that curve where DHC for the proposed filter is equal to DHC of the current filter at change out. The total cost calculation of the proposed filter can then be subtracted from the total cost calculation of the existing filter to determine a total cost change that would result from using the proposed filter, and this information can be presented to the user of the system.

Additional examples of cost information that a user can be prompted to enter include work or school absenteeism caused by inappropriate air filtration. Use of a higher efficiency filter that consumes more energy but that produces cleaner air and in turn reduces the absenteeism in schools and improves the education efficiency can lower cost of teaching and providing a better education, and in a business can increase the overall productivity. Thus, a user of the system could enter estimates of this information as well, which can be factored into the overall cost estimates of current and proposed air filters in order to provide a comprehensive cost comparison.

The system and process of the present invention can also be utilized to determine the optimum proposed filter change out processed air volume for a particular filter, or volume driven changeout schedule. This can be done on its own as a useful determination or can be done in combination with the above calculations to first determine the impact of switching to a proposed filter operated for the same duration as the current filter, and then to optimize the change out point of the proposed filter. In FIG. 1, this process is shown in the right side and following the determinations of cost as already discussed. As indicated, however, this optimization process could be conducted as a standalone evaluation of a particular method of use of a filter in a particular system.

Thus, still referring back to FIG. 1, according to this aspect of the invention, steps can be taken to optimize operation of the filter to be used (step 26). This process can be followed by calculating cost when operating up to a selected pressure drop (wherein the first iteration can optionally be for the same pressure drop as the filter type being replaced) (step 28), tabulating the result, selecting an incrementally changed pressure drop (step 30) and repeating a sufficient number "n" of times until a reasonable number of data points, for example 5, has been run. The results of these iterations can then be used to generate and present a report (step 32) showing results with different changeout times (i.e., the pressure drop at which the filter is changed), such that a user can decide when the proposed filter should be changed for optimized performance.

It should be appreciated that although atmospheric conditions are not constant, when comparing two filters the relative performance of the filters with respect to each other are very good indicators since both filter estimates are based on the same atmospheric conditions which is a reasonable assumption for the same premises.

The ASHRAE Standard 52.2 is useful for generating various different information and parameters for a particular filter. Another standard which could be used is as EN 779, and other similar standards could likewise be used.

As indicated above, one focus of the present disclosure is to utilize total air volume treated by the filter as a key piece of user experience information.

Figure 2:
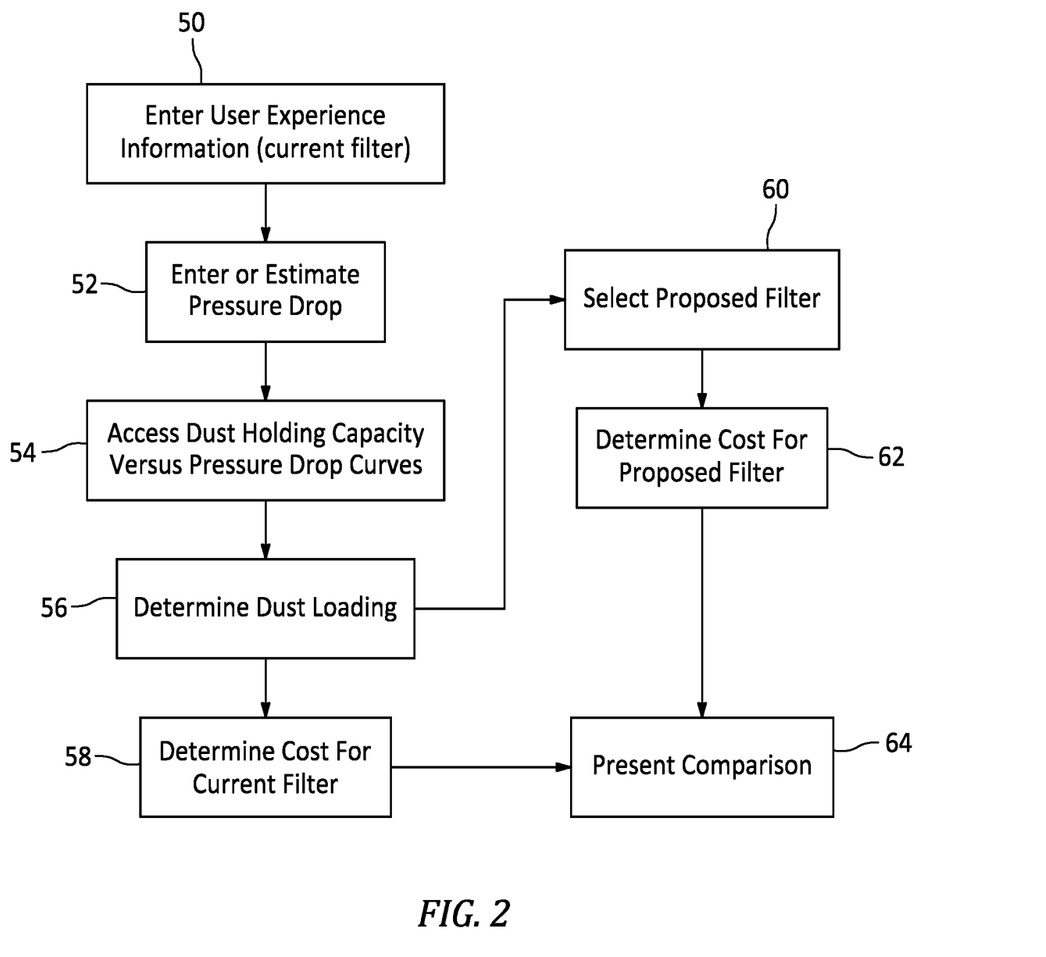
FIG. 2 schematically illustrates an embodiment of the invention wherein user experience includes air volume handled by the system, and wherein this information is combined with either actual or estimated pressure drop to determine dust loading, and thereby to prepare a comparison of energy use with an existing filter in a system, as compared to a proposed filter in the system.

FIG. 2 illustrates in block diagram the operation of one preferred embodiment of the invention. As shown, this portion of the method can start with entry of user experience information which is obtained with a current filter (step 50). This user experience information should include either a measured total volume of air treated by the filter, or information sufficient to calculate or estimate this total volume of air. At this stage, pressure drop at changeout is also needed, and can be entered if known, or estimated (step 52). With this information, a processor carrying out this method can access the DP v. DHC curves (step 54) for the current filter and determine a dust loading level or capacity corresponding to the entered user experience information, specifically the pressure drop and volume of air processed at that pressure drop (step 56). The dust loading sets the position relative to the horizontal axis on the curve for that filter, and the shown pressure drop can then be used to determine or estimate the energy used to operate the system and, from that, the cost (step 58). Of course, in some instances, energy cost will be the only cost criteria considered, and in others, it will be one of many criteria considered. Further, in some instances the cost factor may not be based at all on energy cost.

FIG. 2 shows that this process can be conducted for one or more proposed different filters (step 60) and results in determination of cost or estimated cost for use of the proposed filter(s) (62). Cost and/or estimated cost can then be presented as a comparison, step 64, at which point a user can decide to implement a proposed filter and filter changeout schedule as desired.

A proposed filter can be selected by the user from a library of different filters with which the system is communicated. The total available base of filters can itself be filtered to only allow selection by the user of filters that will fit the air filtration system in question and are adequate for any particular issues at that location.

A determination of estimated cost of use of the selected proposed filter(s) can then be made (step 62) by consulting the DP v. DHC curves for the selected proposed filter which will allow estimation of the behavior of the proposed filter in terms of pressure drop as theoretical dust accumulates on the filter up to one of either a pre-selected pressure drop or the volume of air processed by the original or current air filter. With this information, an estimated cost for use of the proposed filter to process the volume of air can be determined.

As set forth above, the process illustrated in FIG. 2 leads to results of steps 58, 62 being compared and the comparison presented in an output to a user (step 64), for example presented on a display of a device carrying out the process.

Figure 3:
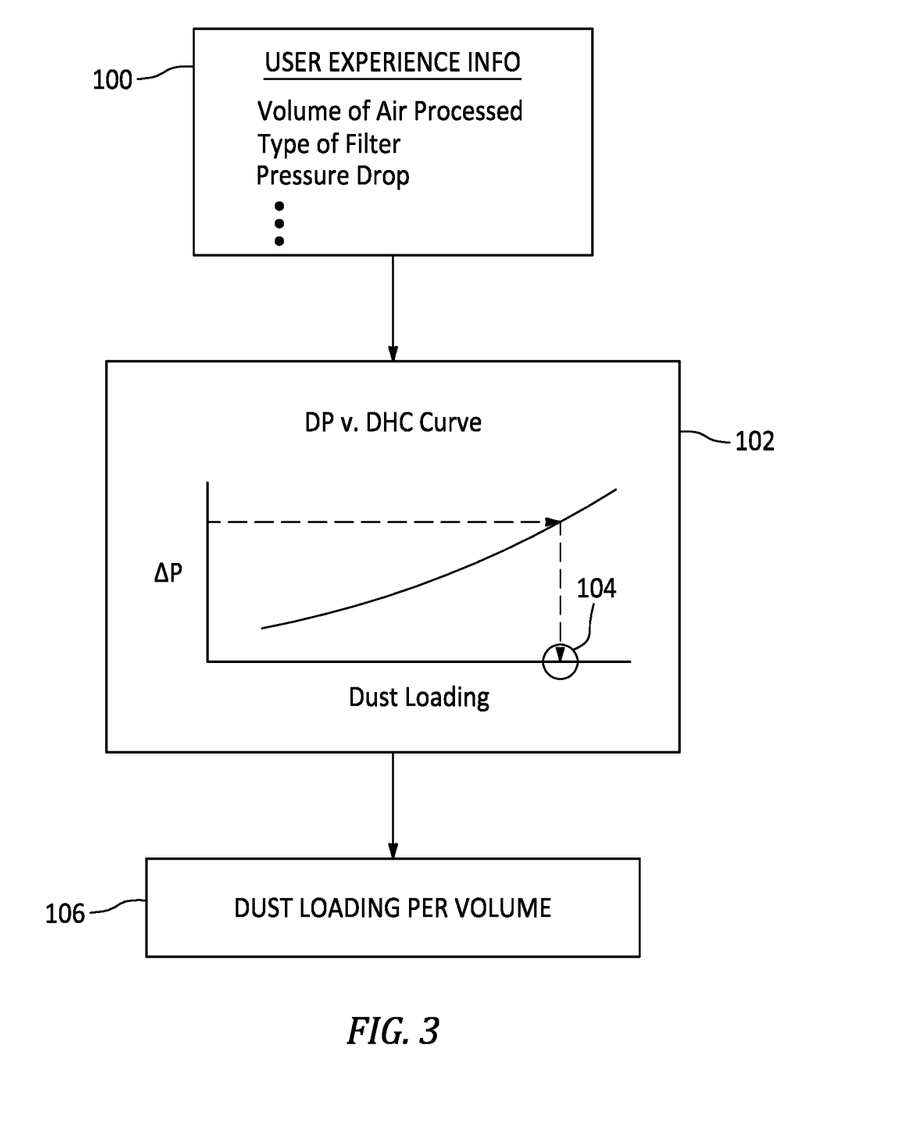
FIG. 3 illustrates initial steps of a method and operation of a system according to the invention.

FIG. 3 schematically illustrates a first portion of one configuration of a process as disclosed herein. FIG. 3 starts, as with the discussions above, with entry of user experience information that can include the volume of air handled by the filter, type of filter, pressure drop across the filter after processing the volume of air, and other information as mentioned herein (step 100). As shown at step 102, the pressure drop can be used on the DP v. DHC curve for that filter to measure dust loading at the pressure drop for that filter. A typical DP v DHC curve is shown in this portion of FIG. 3, and shows a curve representing pressure drop increasing as dust loading or DHC increases. Manually, this step could be conducted by finding the pressure drop on the vertical axis of the plot, and cross referencing to the curve and then the horizontal axis to find a value for DHC or dust holding capacity for that filter at that pressure drop. This point is shown at 104 in FIG. 3. This value represents the amount of theoretical or test dust that will be held by the selected filter at the pressure drop that was entered in the user experience information.

This amount of dust or dust loading can then be configured as dust loading over total processed air volume during which the filter was in operation (step 106), and this gives an excellent indication of the environmental factors to which the system and filter are exposed, especially the air quality, i.e. the amount of dust and other debris or particulate carried by the air that is to be filtered out. In addition, the DHC value is reasonably interchangeable with DP v. DHC curves for other filters, so the value at point 104 can be used on other curves for other filters to find an estimate of the pressure drop that would be exhibited across the other filter when at this level of dust. These curves, along with the estimation of quantity of theoretical dust accumulated on the filter during processing of the known volume of air, allow useful determinations with respect to other selected or proposed filters.

Figure 4:
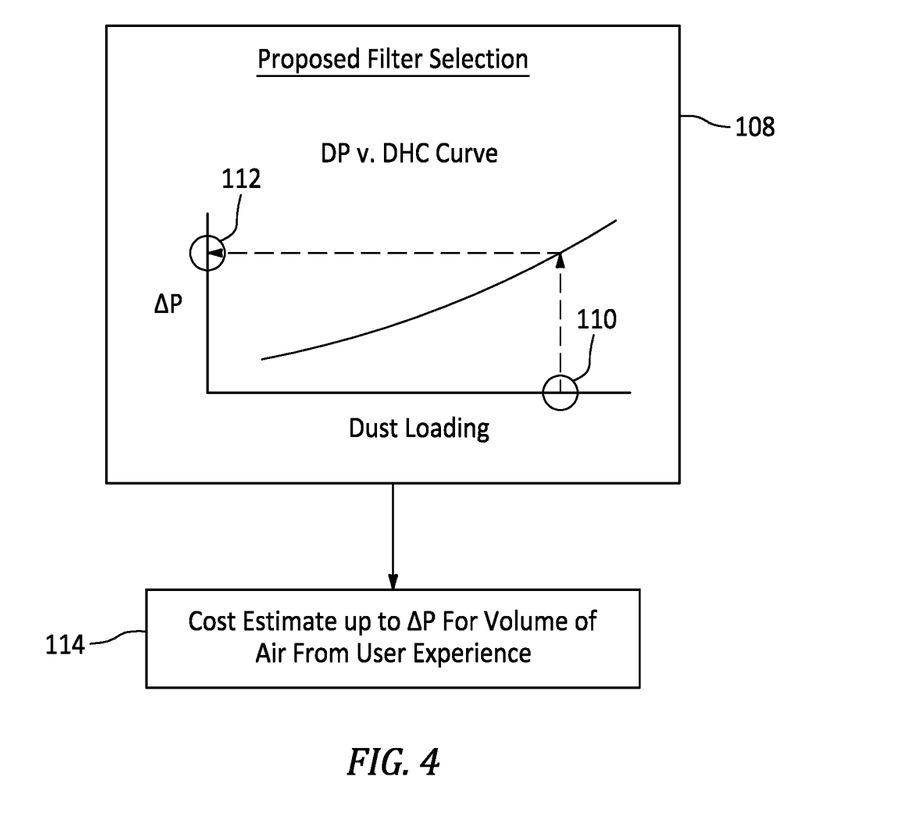
FIG. 4 illustrates one embodiment of concluding steps of a method and operation of a system according to the invention.

Now considering FIG. 4, this step is illustrated. Once a different filter is selected (or proposed) for consideration, the dust holding value 104 from FIG. 3 can be located on the horizontal axis of the DP v. DHC curve for the proposed filer, and referenced to the vertical axis to find an estimated of the pressure drop with the proposed filter for this level of dust. This is shown at step 108, wherein point 110 represents the value of dust carried over from point 104 of FIGS. 3, and 112 represents the estimated pressure drop 112 for that filter at the level of dust represented at point 110.

At this stage, the proposed filter will likely have a different pressure drop for processing the volume of air than was shown with the original or "current" filter. In one configuration, the comparison to be presented to the user can be presented as a cost factor per unit volume. Ultimately, the best comparison will include an optimization of when (at what pressure drop) to change out the proposed filter. Until that optimization is done, however, cost can be pro-rated for the proposed filter to provide a comparison. In the representation in FIG. 4, the curve for the proposed filter can be utilized to determine the amount of energy to operate the system against the pressure drop represented by the portion of the curve from the beginning of operation up to changeout of the filter, at the same volume of air processed as the original filter and this leads to a determination of the cost (step 114) for operating the system with a proposed filter up to the pressure drop that had been used as the changeout point for the previous filter. This information can be presented on a display to the user at this stage.

Figure 5:
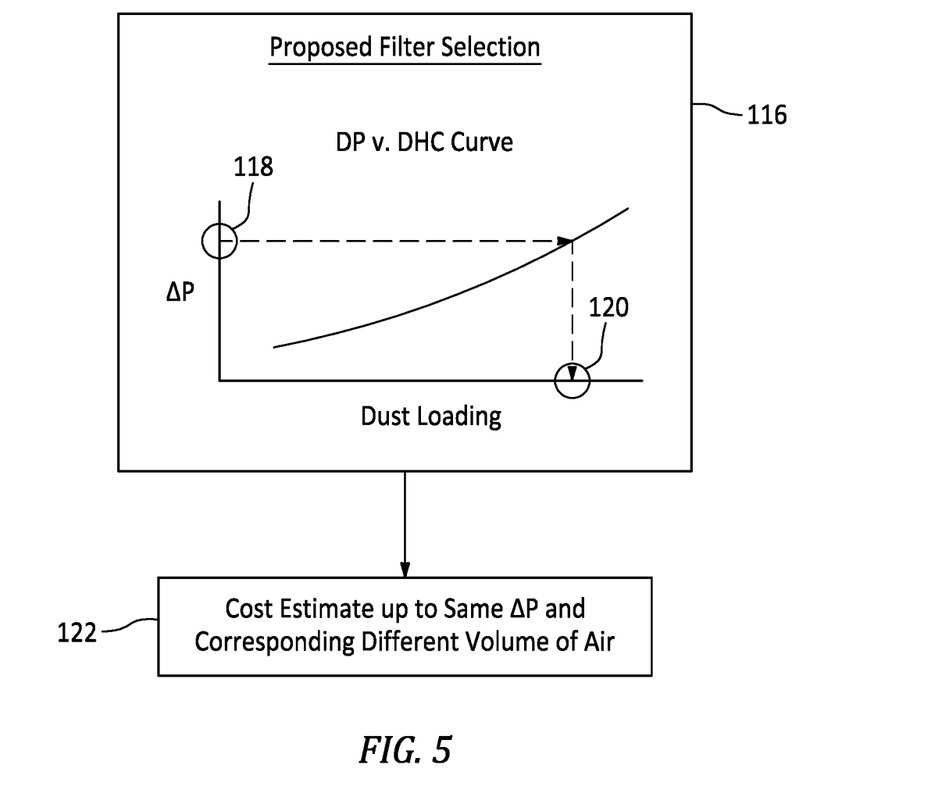
FIG. 5 illustrates another embodiment of concluding steps of a method and operation of a system according to the invention.

Alternatively, and referring to FIG. 5, a determination can be made as to cost of operating with the proposed filter up to the same pressure drop as was the changeout point for the previous filter. In this method, a proposed filter can be selected 116, and the pressure drop from the previous changeout point can be located on the curve for the proposed filter (shown at 118). This pressure drop can then be cross referenced to the curve and dust holding line to determine a dust loading on the proposed filter that will correspond to the entered pressure drop, this dust loading is shown at 120. In order to determine how much more or less volume of air will be processed to reach the same pressure drop with the proposed air filter, it can be helpful to determine a theoretical dust load per volume of air processed by the original filter, which would represent the conditions to which the proposed filter will likely also be exposed.

With this ratio, the incremental difference in dust holding on the horizontal axis of the curve for the proposed filter can be used to determine how much more or less volume can be processed with the proposed filter to reach the pressure drop at which the filter will be changed (step 122). In this way, better ability of a filter to handle more loading can be used in some instances to operate the filter for longer periods of time and thereby potentially save in filter costs and the like.

It should be appreciated that for reasons of understandability, the DP v. DHC curves are shown in the drawings. Of course, in software implemented to use these curves to make determinations, there would be no need for manually cross referencing values, and some intermediate steps that have been explained for purposes of clarity could be skipped in the processor implemented methods.

It should be appreciated that the method as disclosed herein can be implemented in a system having a user interface for entry of user experience information, wherein the system includes a processor and is in communication with the test standards for a plurality of air filters as discussed herein. This system would further include a display for presenting the information determined in the form of filter use comparisons, optimized changeout plans and the like.

The system can be embodied in a series of programmed machine operations which can be carried out on a wide variety of computing devices such as mobile devices, desktop or laptop computers, PDAs, industrial workstations and/or servers which can be accessed by any of the foregoing. While it is anticipated that the machine instructions would be embodied in a program which is compatible with typical operating systems, it could also be incorporated into a dedicated machine which could have different operating systems as well, the key being to have programmed capability for accepting various choices from the user and storing various relationships to which the choices of the user are applied to determine certain output, and finally with formatting capabilities to present that data in a desired manner, for example in graph or chart form or the like.

As mentioned above, in some instances the volume of air handled by a system using the filter(s) of interest will be known directly due to measurement with the appropriate instruments. However, if not directly measured and known, the volume of air can be determined in a number of different ways. For example, one or more probes can be placed in ducts of an air handling system, wherein the probes are configured to measure air flow or air flow velocity past the probe. With a known cross section of the area where the probe is located, a volumetric flow rate can be determined, and combined with a known or estimated amount of operation time of the system, the total volume of air handled by the system can be determined.

As mentioned above, the user experience information can include many different piece of information or data, for example including the time of operation, average change-out cycle, number of filters in a system, system efficiency, local $CO_2$ emissions, local energy costs and various other aspects of the actual system, all of which can be collected so that the calculations to be made can be based as much as possible upon the actual system in question.

Also collected at this time is information related to the current filter used by the HVAC operator, and various information related to this filter such as the average pressure drop of the filter when changed, cost of each filter, etc.

It should be understood that the illustrations provided in the drawings show samples of how the system and method according to the invention can be used by specific individuals such as administrators, dealers, licensees and customers to obtain and/or provide useful information. These illustrations are by way of example, and it is of course understood that other presentations could be made by methods and systems operating according to the method and still be well within the scope of the present invention.

I claim:

1. A method for determining a filter selection for an air filtration system having a current air filter, comprising the steps of:

entering filtration system information into a processor having access to pressure drop versus dust holding capacity curves for a plurality of different air filters, wherein the filtration system information includes user experience information including volume of air processed with the current air filter in the air filtration system and pressure drop with the current air filter after processing the volume of air;

determining a cost factor of operating the air filtration system with the current filter for processing the volume of air;

determining a theoretical quantity of dust held by the current filter at the pressure drop using a pressure drop versus dust holding capacity curve for the current air filter and the pressure drop exhibited by the current air filter after processing the volume of air;

selecting a proposed air filter from the plurality of different air filters and different from the current air filter;

determining an estimated volume of air that can be processed with the proposed air filter to reach the pressure drop, this determining step being conducted using the theoretical quantity of dust and a pressure drop versus dust holding capacity curve for the proposed air filter;

determining an estimated cost factor of operating the air filtration system with the proposed filter for processing the volume of air; and presenting a comparison of the cost factor and the estimated cost factor on a display communicated with the processor.

2. The method of claim 1, wherein the steps of determining the cost factor and the estimated cost factor comprise determining cost for processing the volume of air based upon at least one cost criteria selected from the group consisting of filter cost, energy cost, labor cost, used filter disposal cost, carbon footprint cost, number of filter changes needed for processing the volume of air, and combinations thereof.

3. The method of claim 2, wherein the entering step further comprises entering relevant cost criteria of the user into the processor, and wherein the steps of determining the cost factor and the estimated cost factor are based on the relevant cost criteria.

4. The method of claim 3, wherein the processor is configured to determine estimated energy cost from a pressure drop profile of the pressure drop versus dust holding capacity curve for the proposed filter for processing the volume of air.

5. The method of claim 1, wherein the presenting step comprises presenting the comparison as cost per unit volume of air to be processed with the air filtration system.

6. The method of claim 1, further comprising determining an optimized changeout schedule for the proposed filter based upon the estimated cost factor, and wherein the presenting step further comprises presenting the optimized changeout schedule on the display.

7. The method of claim 1, wherein the volume of air processed is obtained from instruments in the air filtration system and provided to the processor.

8. The method of claim 1, wherein the volume of air processed is determined based on energy consumption of a motor of the air filtration system.

9. The method of claim 1, wherein the processor has access to energy cost information, and wherein the presenting step includes presenting estimated cost based upon the energy cost information.

10. The method of claim 1, further comprising optimizing a changeout schedule for the current filter based on the cost factor and presenting an optimized change out schedule for the current filter on the display.

11. The method of claim 1, wherein the user experience information includes a starting pressure drop at a start of operation for the air filtration system using the current air filter.

12. The method of claim 1, wherein the step of selecting a proposed filter comprises limiting possible selection of a proposed filter to filters that will fit the air filtration system.

13. A method for optimizing a changeout schedule for an air filtration system using an air filter based upon user experience with a current air filter, comprising the steps of:

entering user experience information into a processor having access to pressure drop versus dust holding capacity curves for a plurality of different air filters, wherein the user experience information comprises a volume of air processed by the current air filter in the air filtration system and pressure drop of the current filter after processing the volume of air;

using the pressure drop versus dust holding capacity curve for the current filter to determine a theoretical quantity of dust held by the current filter after processing the volume of air;

determining a cost factor for using the current air filter per volume of air processed up to the pressure drop;

determining an estimated cost factor for using the current air filter per volume of air processed up to one or more proposed different pressure drops for changeout; and presenting the cost factor and the comparative cost factor for the current filter on a display.

14. The method of claim 13, further comprising determining a plurality of estimated cost factors for a range of different proposed pressure drops for changeout, and optimizing a proposed changeout schedule based upon the plurality of estimated cost factors.

15. The method of claim 13, wherein the steps of determining the cost factor and the estimated cost factor comprise determining cost for processing the volume of air based upon at least one cost criteria selected from the group consisting of filter cost, energy cost, labor cost, used filter disposal cost, carbon footprint cost, number of filter changes needed for processing the volume of air, and combinations thereof.

16. The method of claim 15, wherein the entering step further comprises entering relevant cost criteria of the user into the processor, and wherein the steps of determining the cost factor and the estimated cost factor are based on the relevant cost criteria.

17. The method of claim 16, wherein the processor is configured to determine estimated energy cost from a pressure drop profile of the pressure drop versus dust holding capacity curve for the current filter for processing the volume of air.

18. A system for determining a filter selection in an air filtration system having a current air filter, comprising:

an interface for entering filtration system information into a processor having access to pressure drop versus dust holding capacity curves for a plurality of different air filters, wherein the filtration system information includes user experience information including volume of air processed with a current air filter in the air filtration system and pressure drop after processing the volume of air;

the processor being configured to receive the filtration system information and to use the pressure drop versus dust holding capacity curves for the plurality of air filters and the user experience information to determine a cost factor for using the current air filter to process the volume of air, and also being configured to determine an estimated cost factor use of a proposed air filter of the plurality of air filters and different from the current filter to process the volume of air; and a display communicated with the processor for presenting a comparison of the cost factor and the estimated cost factor.

19. The system of claim 18, wherein the processor is configured to determine an optimized changeout schedule for the proposed air filter; and to present the optimized changeout schedule on the display.

20. The system of claim 19, wherein the processor is further configured to determine an optimized changeout schedule for the current air filter, and to present the optimized changeout schedule for the current filter on the display.

* * * * *